United States Patent
Ghattu

(10) Patent No.: US 8,180,864 B2
(45) Date of Patent: May 15, 2012

(54) SYSTEM AND METHOD FOR SCRIPTING TOOL FOR SERVER CONFIGURATION

(75) Inventor: Satya Ghattu, Tewksbury, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1685 days.

(21) Appl. No.: 10/939,257

(22) Filed: Sep. 10, 2004

(65) Prior Publication Data
US 2006/0036715 A1  Feb. 16, 2006

Related U.S. Application Data

(60) Provisional application No. 60/573,051, filed on May 21, 2004.

(51) Int. Cl.
*G06F 15/16* (2006.01)
(52) U.S. Cl. .......................... 709/221; 709/222
(58) Field of Classification Search .................. 709/221, 709/222
See application file for complete search history.

(56) References Cited

U.S. PATENT DOCUMENTS

| | | | |
|---|---|---|---|
| 6,005,568 A | 12/1999 | Simonoff et al. | |
| 6,035,119 A | 3/2000 | Massena et al. | |
| 6,043,815 A | 3/2000 | Simonoff et al. | |
| 6,078,322 A | 6/2000 | Simonoff et al. | |
| 6,104,872 A | 8/2000 | Kubota et al. | |
| 6,167,534 A | 12/2000 | Straathof et al. | |
| 6,189,024 B1 | 2/2001 | Bauersfeld et al. | |
| 6,268,852 B1 | 7/2001 | Lindhorst et al. | |
| 6,380,924 B1 | 4/2002 | Yee et al. | |
| 6,449,739 B1 | 9/2002 | Landan | |
| 6,466,240 B1 | 10/2002 | Maslov | |
| 6,484,261 B1 | 11/2002 | Wiegel | |
| 6,625,803 B1 | 9/2003 | Massena et al. | |
| 6,687,733 B2 * | 2/2004 | Manukyan | 709/200 |
| 6,701,514 B1 | 3/2004 | Haswell et al. | |
| 6,765,591 B2 | 7/2004 | Poisson et al. | |
| 6,775,821 B2 | 8/2004 | Scouten | |
| 6,792,460 B2 | 9/2004 | Oulu et al. | |
| 6,842,755 B2 | 1/2005 | Maslov | |
| 7,007,266 B1 | 2/2006 | Isaacson | |
| 7,020,697 B1 | 3/2006 | Goodman et al. | |
| 7,162,698 B2 | 1/2007 | Huntington et al. | |
| 7,171,650 B2 | 1/2007 | Fenton et al. | |
| 7,197,559 B2 | 3/2007 | Goldstein et al. | |

(Continued)

*Primary Examiner* — Patrice Winder
(74) *Attorney, Agent, or Firm* — Fliesler Meyer LLP

(57) ABSTRACT

The present invention provides a scripting tool through which a user can interact with and execute scripting instructions of a scripting language on a server to perform administrative tasks. It interprets scripting instructions either interactively, supplied one-at-a-time from a command prompt on a scripting interface, or in batches via a script file, and it can be used either online or offline. The scripting tool enables a user to interact with the server in a session-like manner by establishing a persistent connection with the server. Once the connection is established, each instruction that the user enters to configure the server may use the same connection that has already been established. Such "session-permanent-connection" approach eliminates the need for the user to establish and re-authenticate a connection for each instruction. The scripting tool is also capable of converting an existing configuration file into a reusable script that can be used to create duplicate configurations. This description is not intended to be a complete description of, or limit the scope of, the invention. Other features, aspects, and objects of the invention can be obtained from a review of the specification, the figures, and the claims.

31 Claims, 6 Drawing Sheets

U.S. PATENT DOCUMENTS

| | | |
|---|---|---|
| 7,206,824 B2 * | 4/2007 | Somashekar et al. .......... 709/220 |
| 7,206,827 B2 | 4/2007 | Viswanath et al. |
| 7,236,987 B1 * | 6/2007 | Faulkner et al. ............ 707/104.1 |
| 7,324,983 B1 | 1/2008 | Morris et al. |
| 7,337,408 B2 | 2/2008 | DeLuca et al. |
| 7,343,586 B1 | 3/2008 | Hernandez |
| 7,350,152 B2 | 3/2008 | DeLuca et al. |
| 7,401,259 B2 | 7/2008 | Bhowmik et al. |
| 7,421,484 B2 * | 9/2008 | Das ................................ 709/220 |
| 7,546,581 B2 | 6/2009 | Wainwright |
| 7,555,743 B2 | 6/2009 | Sridhar et al. |
| 7,689,973 B2 | 3/2010 | Kwong et al. |
| 2002/0054090 A1 | 5/2002 | Silva et al. |
| 2002/0198985 A1 | 12/2002 | Fraenkel et al. |
| 2003/0023952 A1 | 1/2003 | Harmon, Jr. |
| 2003/0074606 A1 | 4/2003 | Boker |
| 2004/0085347 A1 | 5/2004 | Hagarty et al. |
| 2004/0098472 A1 | 5/2004 | Styles et al. |
| 2004/0194066 A1 | 9/2004 | Frey et al. |
| 2004/0233234 A1 | 11/2004 | Chaudhry et al. |
| 2005/0193269 A1 | 9/2005 | Haswell et al. |
| 2005/0255861 A1 | 11/2005 | Wilson et al. |
| 2005/0278692 A1 | 12/2005 | Sridhar et al. |
| 2006/0059253 A1 | 3/2006 | Goodman et al. |
| 2006/0070082 A1 | 3/2006 | Sridhar et al. |
| 2006/0122985 A1 | 6/2006 | Yamamoto et al. |
| 2006/0123390 A1 | 6/2006 | Chan et al. |
| 2006/0136490 A1 | 6/2006 | Aggarwal et al. |
| 2006/0276997 A1 | 12/2006 | Drees |

* cited by examiner

```
File: assingToCluster.py
connect('system','gumby1234','t3://localhost:7001')
edit()
cmo.createServer('server1')
cmo.createServer('server2')
clusterObj = cmo.getCluster('mycluster')
servers = cmo.getServers()
for x in servers:
  x.setCluster(clusterObj)
save()
activate()
disconnect()
```

Figure 3

```
wls:/mydomain/config> cmo.createLog('log1')
    The configuration is not currently opened for changes. Would you like to do so now (y/
    n)? y
    The Domain Configuration is locked successfully for your changes. Changes must be
    saved at completion using the 'save' function.
wls:/mydomain/config> cmo.createLog('log1')
wls:/mydomain/config !>cd ('Log/log1')
wls:/mydomain/config/Log/log1 !> cmo.setFileName('myLog')
wls:/mydomain/config/Log/log1 !> exit()
    There are outstanding changes that are not saved and activated yet, would you like to
    do so now? (y/n) y
    Saved all the changes and activated. To view the changes that were recently made use
    the 'ct' variable.
    Sure you would you like to exit your interactive shell? (y/n) y
wls:/(Not Connected)>
```

Figure 4

```
wls:/(Not Connected)> connect('weblogic','weblogic')
Connecting to weblogic server instance running at t3://localhost:7001 as
username weblogic ...
Successfully connected to Admin Server 'myserver' that belongs to domain
'mydomain'.
wls:/mydomain/config> cmo
[Caching Stub]Proxy for mydomain:Name=mydomain,Type=Domain
wls:/mydomain/config> cd('Servers')
wls:/mydomain/config/Servers> cmo
[Caching Stub]Proxy for mydomain:Name=mydomain,Type=Domain
wls:/mydomain/config/Servers> cd('myserver')
wls:/mydomain/config/Servers/myserver> cmo
[Caching Stub]Proxy for mydomain:Name=myserver,Type=Server
```

Figure 5

```
wls:/ (Not Connected)> configToScript('c:/bea/user/mydomain/config.xml',' c:/temp/wlst/
config.py')
Converting resource ... DomainLogFilter\OAMdomainLogFilter
Converting resource ... Server\adminServer
Converting resource ... SSL\adminServer
Converting resource ... XMLRegistry\registry_default
Converting resource ... XMLEntitySpecRegistryEntry\myXMLEntitySpecRegistryEntry
Converting resource ... XMLRegistryEntry\myXMLRegistryEntry
Converting resource ... DomainLogFilter\wnewDomainLogFilter
ConfigToScript Successfully completed:, 7 resources are converted.
wls:/ (Not Connected)>
```

Figure 6

SYSTEM AND METHOD FOR SCRIPTING TOOL FOR SERVER CONFIGURATION

CLAIM OF PRIORITY

This application claims priority from the following application, which is hereby incorporated by reference in its entirety:

U.S. Provisional Patent Application No. 60/573,051, entitled SYSTEM AND METHOD FOR SCRIPTING TOOL FOR SERVER CONFIGURATION by Satya Ghattu, filed May 21, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of scripting tools for server configuration.

BACKGROUND

A scripting tool of a server running application software modules provides a scripting interface that a developer can use to interact with and/or configure the server. Here, the scripting interface can be, but is not limited to, a command-line scripting shell (window), a graphical user interface (GUI), a browser, and other suitable interface. Using the scripting tool, a user (an administrator and/or operator) of the server can perform administrative tasks and initiate configuration and/or runtime information changes on the server. Here the server can be, but is not limited to, a web server, an application server, a database server, an administrative server, and other suitable server.

There has been an essential need for a scripting tool that would allow developers and system administrators to perform both simple and complex changes to their server configurations reliably and interactively. Some current scripting tools only allow a user to connect to the server, execute one instruction, and then disconnect, without reserving any state information of the server for subsequent actions. Since such "one-action-connection" approach often performs only one action per connection, they may not be able to capture repeatable and/or sequential configuration steps such as loops, ifs, and other flow-control constructs that the user needs to perform when configuring a server. In addition, since establishing, authenticating each connection takes time, these tools are often slow and inefficient.

BRIEF DESCRIPTION OF THE DRAWINGS

FIG. 3 is a small exemplary script in accordance with one embodiment of the invention.

FIG. 4 is an exemplary script that illustrates how a user can make changes to the configuration data in accordance with one embodiment of the invention.

FIG. 5 is an exemplary code showing the value of the 'cmo' variable in accordance with one embodiment of the invention.

FIG. 6 is an exemplary conversion instruction in accordance with one embodiment of the invention.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Embodiments of the present invention provide a scripting tool through which a user can interact with and/or execute scripting instructions (commands) of a scripting language on a server to perform administrative tasks. It interprets the scripting instructions either interactively, supplied one-at-a-time from a command prompt on a scripting interface, or in batches via a script file. It can be used either online (connected to a running server) or offline (not connected to a running server). Here, the scripting language can define a set of local variables and primitives (pre-defined instructions). The scripting tool can allow a user to customize the server to suit their needs, ease their routine tasks, extend added functionalities, handle repetitive tasks and complex procedures and "glue" application components together to form applications.

In various embodiments, the scripting tool enables a user to interact with the server in a session-like manner by establishing a persistent connection with the server. Once the connection is established, each instruction that the user enters to configure the server may use the same connection that has already been established. Since a persistent connection is maintained throughout the user session (in case the scripting tool is operating in the online mode), multiple steps that are performed against the server can be captured, including instructions that make use of the common features including, but are not limited to, local variables, loops, conditionals and control flow. A scripting language interpreter may be utilized to read and/or interpret the scripting instructions and execute them against the server. The states of all instructions executed may be saved and referenced during the session, and the connection may not quit until the user decides to disconnect from the server. Such "session-permanent-connection" approach eliminates the need for the user to establish and re-authenticate a connection for each instruction and a separate virtual machine such as a Java Virtual Machine (JVM), to run the scripting tool. The scripting tool is also capable of converting an existing configuration file into a re-usable script that can be used to create duplicate configurations; such a feature is extremely useful for moving resource configuration from one domain to another.

Figure 1:
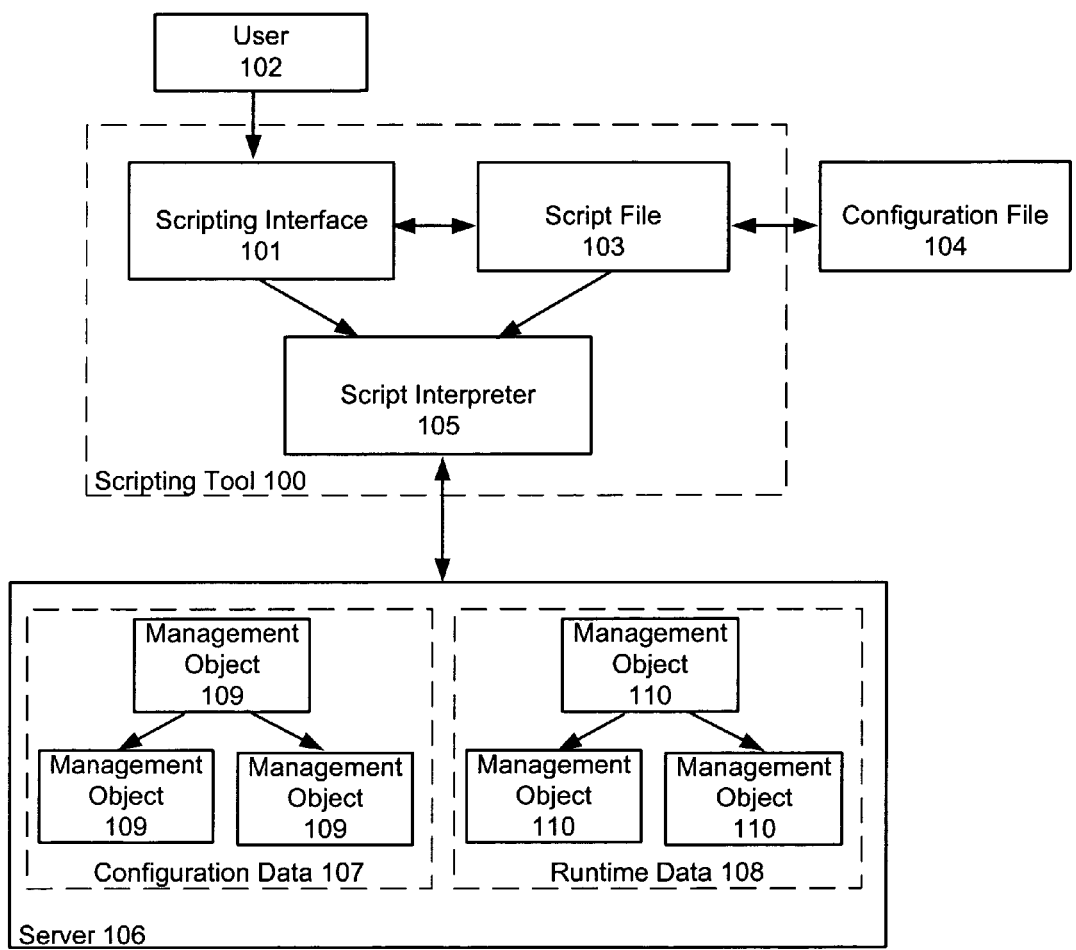
FIG. 1 is an illustration of an exemplary scripting tool in one embodiment of the present invention.

FIG. 1 is an illustration of an exemplary scripting tool 100 in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, a scripting interface 101 of a scripting tool 100 may accept scripting instructions of a scripting language either in interactive mode from a user 102 or in a script mode from a script file 103. Here, the script file can be converted from an existing configuration file 104. These scripting instructions may be interpreted by a script interpreter 105 of the scripting language. Once the scripting tool establishes a connection to a server 106, the user may perform various operations on the server, including navigating, interrogating, and/or updating configuration 107 and/or runtime 108 data on the server. Here, both the configuration and runtime data can be provided in a plurality of management objects 109 and 110, which can be organized in a traversable hierarchy.

Figure 2:
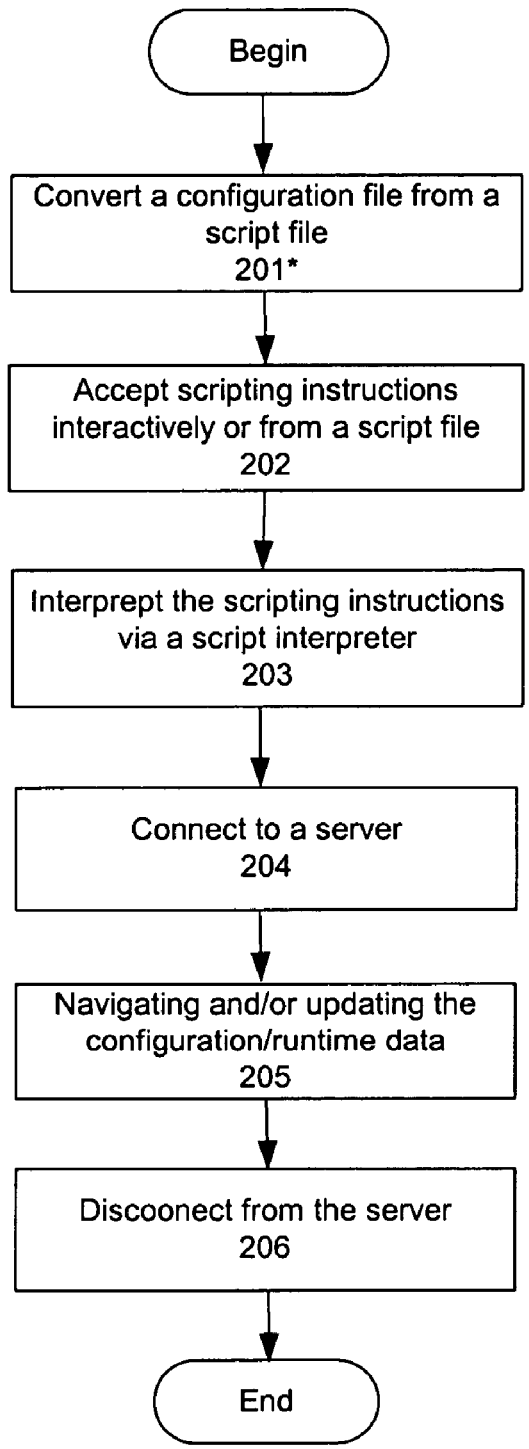
FIG. 2 is a flow chart illustrating an exemplary scripting process in accordance with one embodiment of the invention.

FIG. 2 is a flow chart illustrating an exemplary scripting process in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, a script file containing a set of script instructions of a scripting language can be converted from a configuration file at an optional step 201. The scripting tool may accept instructions either interactively from a user or from a script file at step 202. These instructions can then be interpreted by a script interpreter at step 203. Once the scripting tool establishes a connection to the server at step 204, the user may perform various operations on the server, including navigating and/or updating the configuration and/or runtime data of the server at step 205. Finally, the user may disconnect the scripting tool from the server at step 206 once operations are finished.

In some embodiments, the scripting tool may operate in the following modes:

Interactive mode. This mode lets the user enter instructions and view the response on a command-line prompt. It helps the user to learn the scripting tool and its capabilities, prototyping instruction syntax, and verifying configuration options before building a script. It also allows the user to record all their actions to a script file that they can execute in the script mode. It is particularly useful for getting immediate feedback after making a critical configuration change.

Script mode. This mode lets the user supply a set of scripting instructions in a script file that the tool may execute as a program without requiring user interaction, much like a shell script. It allows the user to apply the same change iteratively and take advantage of scripting language features, such as loops, flow control constructs, conditional statements, and variable evaluations that are limited in interactive mode. The script file can be scheduled to run against the server at variable times. A small exemplary script is shown in FIG. 3, which creates two servers and assigns them to a cluster.

In some embodiments, the script mode may invoke a sequence of scripting instructions without requiring any input from the user, much like a shell script. Using the scripting tool in script mode, the user is capable of at least one of the following:

Automating server configuration and application deployment.

Scheduling scripts to run against the server at various times.

Automating repetitive tasks and complex procedures.

In some embodiments, the scripting tool may support both online and offline configuration of the server. Offline scripting functionality enables a user to create a new domain or update an existing domain on the server without requiring the server to be up and running. Here, a domain is a set of resources that can include, but are not limited to, applications, printers, and other suitable contents for the user. Similar to online scripting, offline scripting can be run in both interactive mode and script mode. However, the scripting tool may provide access only to persisted configuration information offline. The user can retrieve and change configuration values that are stored either in the domain file or in a domain template.

In some embodiments, the configuration information of a server can be arranged in a hierarchical fashion to allow for easy navigation. The scripting interface of the scripting tool can allow the user to navigate all configuration information for a given domain on the server by invoking methods on the domain or its children. The scripting interface may let the user easily navigate through all the information in the domain, including both the configuration and runtime information.

In some embodiments, the configuration and/or runtime information of a server (that can be defined as global and/or local variables) is available through configuration management objects, which are software components on the server that can be arranged in a traversable hierarchy, which can be, but is not limited to, a tree. The scripting tool can allow the user to navigate, interrogate, and/or update the configuration data of the server by invoking methods on the management objects once the scripting tool is connected to a running server. After navigating to a management object, the user may interact with the object to navigate and/or interrogate all the management objects in a domain, including configuration, runtime, administration, and any custom management objects registered in the server using scripting instructions.

In some embodiments, a user can interact with more than one management object at a time in the interactive mode. When a user first connects to the server through the scripting interface, a variable called 'cmo' (acronym for Current Management Object) can be set to the current management object that the user navigates to, and it can be initialized to the root of all configuration management objects. The user can then navigate to the children management objects by using the 'cd', 'ls', and 'pwd' instructions, in a similar way that a user would navigate a file system using a UNIX or Windows command shell. For example, the 'ls' instruction can display all configuration management objects to which the user is navigating, depending on optional instruction arguments that the user may supply. Using the 'cd' instruction, the user can navigate to any management object contained in the hierarchy.

In some embodiments, the runtime (when the server is up and running) information of the domain is also available in a hierarchical fashion similar to the configuration information. A user of the scripting tool can browse the runtime management objects by using the 'runtime' instruction, which will place the user at the root of all runtime management objects. The user can also set the 'cmo' variable to the root if the user did not navigate to the runtime hierarchy after starting the user session; otherwise, the user is placed at the last place the user navigated to in the runtime tree. The navigation model for runtime is similar to that for the configuration except that it is domain-wide and un-editable. If the user chooses to navigate to a configuration management object from a runtime tree, he/she can do so by using the 'config' instruction that will place the user at the last configuration management object when he moved to the runtime tree.

In some embodiments, the scripting tool may allow a user to enforce a grouping on a set of modifications that are being made to the configuration data of the server. All the changes that are made through the scripting tool are considered to be a set of modifications or batch changes. In either interactive mode or script mode, the user must exclusively start changes by issuing an instruction called 'edit' that will provide write access to the configuration data as a whole; thenceforward, all modifications to the configuration data are contemplated to be a part of a batch change that is not committed until the user executes the 'save' instruction with which all these changes are simply written to a working version of the configuration. An 'activate' method initiates the distribution and is responsible for making the prepared set of changes that have previously been saved in the current configuration.

In some embodiments, a user may obtain an exclusive configuration lock on the management objects before making any changes, and release the lock after successfully completing the changes. The user can also clearly demarcate a change not to be treated as a batch change by setting a variable named "autocommit" to 'true' via the scripting interface. The scripting tool may display a message indicating that the configuration data should be locked for changes if the user tries to make a change without explicitly calling the 'edit' function in the interactive mode. At any point, if the user forgets to call 'save' after issuing an 'edit' instruction and chooses to exit the scripting interface, the user will be warned about the outstanding non-committed changes. At this point, the user has an option to commit all the changes or abandon all the changes that were made to the configuration data. An exemplary script that illustrates how a user can make changes to the configuration data is shown in FIG. 4.

In some embodiments, a user may introspect the metadata that defines configuration management objects before making any configuration change. The metadata is not only needed when editing existing configuration data (i.e. when a management object is available), but also during the creation process (when no management object is available). The scripting tool may also allow the user to validate any attribute changes that they are willing to make by calling the appropriate methods on the management object.

In some embodiments, the scripting tool may provide useful feedback to a user who is using the tool. All errors will be reported in a consistent manner such that users can take appropriate actions. All the feedback will be appropriately documented such that the user can parse the output via a parsing tool. Stack traces may be hidden from the user as much as possible, and the user may choose to view the exception stack traces by calling a 'dumpStack' instruction.

In some embodiments, the scripting tool can be implemented in the Java programming language environment, wherein the tool can support a script interpreter for a scripting language, such as Jython. A user can extend a scripting language to suit their needs by following the Jython language syntax. In addition, a management object on the server can be an instance of a MBean (managed bean), or an object of a class defined by an object-oriented programming language such as C++. Here, the MBean is a Java bean that represents a manageable resource, which includes, but is not limited to, an application, a service, a component, and a device. The scripting tool can then access MBeans via Java Management Extensions (JMX), which provides the tools for building distributed, web-based, modular and dynamic solutions for managing and monitoring devices, applications, and service-driven networks.

In some embodiments, the configuration and runtime MBean hierarchies correspond to drives, while MBean types and MBeans instances correspond to directories and MBean attributes and operations are files. MBeans in an application server domain can be arranged in a hierarchical structure. The scripting tool provides access to the MBeans by using a model that is similar to the directories in a file system: the root directory is called domain MBean in the configuration hierarchy; the MBean type is a subdirectory under the root directory; the name of the MBean (the MBean instance) is a subdirectory under the MBean type directory; and MBean attributes and operations are nodes (like files) under the MBean directory. Each MBean instance is a subdirectory of an MBean type. In most cases, there can be multiple instances of a type. After navigating to an MBean instance, the scripting tool may interact with the MBean using scripting instructions. When the user navigates to an MBean type, the 'cmo' reflects the parent MBean. When the user navigates to an MBean instance, the value of the 'cmo' is changed to the current MBean instance, as shown by the exemplary code in FIG. 5. Similar to the configuration MBeans, runtime MBeans in a server can also be arranged in a hierarchical structure.

In some embodiments, a set of local variables and primitives (pre-defined commands/instructions) can be defined by the scripting tool. All variables can be initialized to their default values at the start of a session and can be adjusted according to the user's interaction with the scripting tool. A user can also extend or modify the primitives supported by the scripting tool by following the Jython language syntax. Most of the primitives defined are convenience instructions, which are mostly executable functions that are extensions to Jython language readily available to the user of the scripting tool at the start of a user session.

In some embodiments, the scripting tool may allow a user to use a set of variables at the start of a user session either in script or interactive mode. This set of variables may include, but is not limited to, the following:

- current management object (CMO), which is set to the management object that the user is navigated to.
- autocommit, which allows a user to immediately commit any modification that has been made to the configuration.
- exitonerror, which allows for terminating the script execution in case an exception is encountered.
- version, which indicates the current version of the running server.
- connected, which indicates whether the user is connected to the server or not.
- Etc.

In some embodiments, the scripting tool may define a set of primitives that are available in both interactive and script mode, online or offline. These instructions can include, but are not limited to, the following categories: Control, Browse, Edit, Deploy, Lifecycle, and Information.

In some embodiments, the set of online control instructions may include, and is not limited to, the following:

- connect, which lets a user to connect to a running server by specifying the username, password and the URL of the server they choose to connect to. The user may also have an option to use the encrypted password that is stored locally by specifying the locations as arguments to the 'connect' function. After the users successfully connects to the server, all the local variables will be initialized. Using the 'connect' instruction while already connected to a server will result in disconnecting the user from the current server he is connected to and connecting to another server with the passed in arguments.

storeuserconfig, which stores the username and password that were used to connect in specified locations for future connections.

exit, which disconnects a user from the interactive session and closes the interactive shell.

In some embodiments, there can be two lifecycles in offline scripting, depending on the desired task a user wishes to perform. One task is to create a new domain from a domain template file, such as a jar file under Java environment. Lifecycle instructions for this task can include, but are not limited to, the following:

readTemplate, which reads a domain template file from the file system and makes the template available for editing.

writeDomain, which writes the in memory domain template currently being edited to the file system. The template continues to be editable after executing this instruction.

closeTemplate, which indicates the completion of work on the current domain template. After issuing this instruction, the template is no longer available.

The second task is to update or extend an existing domain with application/service template (i.e. extension template). Instructions used for this task can include, but are not limited to:

readDomain, which reads an existing domain (directory) from the file system and makes the domain available to be edited in memory.

addTemplate, which reads an application/service (extension) template from the file system and adds it to the domain existing in memory.

updateDomain, which writes the in memory domain template currently being edited to the file system the file system.

closeDomain, which indicates completion of work on the current domain. After issuing this instruction, the domain is no longer available for edit.

In some embodiments, the scripting tool can provide a set of browse instructions to allow a user to easily walk through both the configuration and runtime artifacts of a running server. These browse instructions can include, but are not limited to:

cd, which allows a user to navigate to any child management object that is contained in the management object currently navigated by the user and back to the parent management object.

config, which allows a user to navigate to the configuration tree from runtime.

runtime, which allows a user to navigate to the runtime tree.

prompt, which hides the current prompt that might be too long and display '/>' as the prompt.

In some embodiments, the scripting toll can provide a set of online edit instructions to update the config and/or runtime information on a running server. These edit instructions can include, but are not limited to, the following:

edit, which attempts to lock the configuration of the domain for any changes. This instruction should be called prior to invoking a "setAttribute" method on any management objects associated with the configuration of the server unless the 'autocommit' variable is set to true. If another user is in the process of making changes, executing 'edit' will display a message that the user cannot make changes until the other users' changes have completed.

save, which initiates the final validation and persistence of the changes that are underway.

undo, which reverts all of the changes that were underway and leaves the configuration in the state that it was prior to the initial call to 'edit'.

activate, which initiates the distribution and ultimate persistence of a prepared set of changes that have previously been saved with the 'save' instruction.

get, which can be used to get any attribute for the currently navigated management object.

set, which can be used to set any attribute for the currently navigated management object.

create, which can be used to create any child management object that can be created under the currently navigated management object.

delete, which can be used to delete any child management object that can be deleted under the currently navigated management object.

invoke, which can be used to invoke any operation on the currently navigated management object.

In some embodiments, the scripting toll can provide a set of offline edit instructions to update the config information on a server. These edit instructions can include, but are not limited to, the following:

assign, which assigns individual configuration resources to certain destinations.

assignAll, which assigns all applications or certain service resources to specified destinations.

unassign, which unassigns individual configuration resources from specified destinations.

unassignAll, which unassigns all applications or certain service resources from specified destinations.

setOption, which can be used to set certain options related to domain creation or update.

In some embodiments, the scripting tool can provide a set of deploy instructions to deploy or undeploy an application on a server. These deploy instructions can include, but are not limited to, the following:

deploy, which can deploy an application to a server and take the application name and path as arguments.

undeploy, which can undeploy an application from a server, with the application name and targets from which this application to be undeployed supplied as arguments.

redeploy, which can redeploy an existing deployed application by taking the name of the application to be re-deployed as an argument.

In some embodiments, the scripting tool can provide a set of lifecycle instructions to operate on the lifecycle of a server. These lifecycle instructions can include, but are not limited to, the following:

shutdown, which can be used to gracefully (vs forcibly) shutdown a running server or a cluster from the scripting tool. This instruction takes as its arguments the type (Server or Cluster) and server name or a cluster name that the user decided to shutdown, a boolean variable to ignore sessions while shutting down and a timeout.

forceshutdown, which can forcibly shutdown a server or a cluster without waiting for any in-flight work that has to be completed by the servers.

start, which can be used to start a managed server or a cluster that is configured in a domain. This instruction will accept the type (server or cluster) and name of the server or cluster to be started as arguments. The listen port and listen address can be supplied as optional arguments to start the server.

suspend, which can be used to suspend a server that is running. It may accept the name of the server to be suspended as an argument.

resume, which can be used to resume a server that is suspended. It may accept the name of the server to be resumed as an argument.

state, which allows a user to check the state of a managed server and take an action depending on the state of the server.

migrate, which can be used to migrate a service of a targeted server within a cluster.

In some embodiments, the scripting tool can provide a set of information instructions that can include, but are not limited to, the following:

ls, which is a convenient instruction that lists all the management objects, attributes or operations of the user navigating the management objects depending on the optional parameter.

getMBI, which provides a user with the information on the management object user requested. This instruction will be useful in an interactive mode where a user can interrogate the current management object navigated for the information of any child management objects the user would like to create or modify.

help, which can display help about all the primitives and variables that are supported by the scripting framework.

dumpvariables, which can print all the variables and their values.

startrecording, which can start recording all the user actions that were performed using the scripting tool.

stoprecording, which can stop recording user actions if any recording is in progress.

pwd, which can print the present hierarchy at which the user has navigated to incase the user has hidden his/her prompt by using the prompt function.

dumpstack, which allows a user to view any stack trace that might have been thrown while performing any scripting action.

In some embodiments, the scripting tool is capable of converting an existing configuration file into an executable script file that can be used at multiple sites to duplicate the configuration of the domain and/or server with or without any modifications. Here, the configuration file can be an XML file such as config.xml. Such conversion allows the capturing of repeatable configuration and the sharing of a complex configuration changes between users at one level or between levels of the lifecycle of a server (e.g., between the level of development and staging of a server) and applying the same change iteratively. A user need not be connected to a running server to execute such conversion. An exemplary conversion instruction is shown in FIG. 6.

Referring to FIG. 6, the user can convert resources that are configured in config.xml to an executable script file that can be used to re-create these resources on a different server using the instruction called "configToScript". The generated script when executed will start a brand new server (if invoked from an empty directory) and run the script against that server. The syntax of the conversion instruction is:

configToScript (configpath, scriptPath, [overwrite], [startServer], [resourceList], [createDeleteFile])

wherein configpath is the path of the config.xml to be converted; scriptPath is the name and path of the script file. If overwrite (optional) is set to 'true', the script file may be overwritten. StartServer (optional) first checks if a server is running and connects to it to execute the script. If it is set to 'false', the server will not be started. ResourceList (optional) is a comma-separated list of resources that will be converted. Finally, if createDeleteFile (optional) is set to 'true', an additional script will be created that will revert all the created resources.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "instruction" is used in the embodiments of the systems and methods described above, it will be evident that such concept can be interchangeably used with equivalent concepts such as command, primitive, and other suitable concepts. While the concept "interface" is used in the embodiments of the systems and methods described above, it will be evident that such concept can be interchangeably used with equivalent concepts such as shell, window, browser, and other suitable concepts. While the concept "object" is used in the embodiments of the systems and methods described above, it will be evident that such concept can be interchangeably used with equivalent concepts such as instance, and other suitable concepts. While the concept "bean" is used in the embodiments of the systems and methods described above, it will be evident that such concept can be interchangeably used with equivalent concepts such as class, interface, object module, component, method, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to provide a scripting framework for server configuration, comprising:
   a server associated with an existing configuration file that contains configuration data of the server, wherein the server is capable of maintaining a plurality of configuration management objects organized in a traversable hierarchy, wherein each of the plurality of configuration management objects is capable of maintaining a portion of the configuration data of the server; and
   a scripting tool, running on one or more processors, operable to
      convert the existing configuration file into an executable script file with a plurality of scripting instructions in a scripting language;
      interpret the plurality of scripting instructions from the executable script file;
      establish a connection to the server;
      perform a plurality of operations on the server using the plurality of scripting instructions via said connection;
      maintain the connection until all of the plurality of operations are completed;
   wherein the scripting tool is further operable to receive scripting instructions directly from a user, display results of the scripting instructions to the user, and record the scripting instructions received from the user into a script file which can be later executed by the scripting tool; and
   wherein the scripting tool enables the user to navigate, interrogate, and/or update the configuration data of the server by invoking methods on the plurality of configuration management objects once the scripting tool is connected to the server when the server is running.

2. The system according to claim 1, wherein:
the server can be one of a web server, an application server, a database server, and an administrative server.

3. The system according to claim 1, wherein:
the traversable hierarchy can be a tree.

4. The system according to claim 1, wherein:
each of the plurality of configuration management objects can be a managed bean (MBean) in a Java programming environment.

5. The system according to claim 1, wherein:
an operation in the plurality of operations can be one of:
   starting and/or shutting down the server;
   deploying and/or undeploying an application on the server;
   navigating and/or updating the one or more configurations management objects; and
   recording and saving the one or more scripting instructions into the script file.

6. The system according to claim 1, wherein:
the scripting language can be based on Jython syntax.

7. The system according to claim 1, wherein:
the scripting language is capable of defining a plurality of variables and/or a plurality of categories of scripting instructions.

8. The system according to claim 7, wherein:
each category in the plurality of categories can be one of control, browse, edit, deploy, lifecycle, and information.

9. The system according to claim 1, wherein:
the scripting tool includes
   a scripting interface capable of accepting the one or more scripting instructions interactively and interacting with the server.

10. The system according to claim 9, wherein:
the scripting tool is operable in interactive or script mode.

11. The system according to claim 1, wherein:
the configuration file can be in XML format.

12. The system according to claim 9, wherein:
the scripting interface can be one of a command-line scripting shell, a graphical user interface, and a browser.

13. The system according to claim 1, wherein:
the scripting tool supports offline configuration of the server using one or more configuration management objects that allows a user to create a new domain or update an existing domain on the server.

14. The system according to claim 1, wherein:
the server is also capable of maintaining one or more runtime management objects organized in a separate traversable hierarchy, wherein each of the one or more runtime management objects is capable of maintaining a portion of runtime data of the server.

15. The system according to claim 1, wherein:
the user obtain an exclusive configuration lock on the one or more configuration management objects before making any changes, and releases the lock after successfully completing the changes.

16. The system according to claim 1, wherein:
the user introspect one or more metadata that defines the one or more configuration management objects before making any changes.

17. The system according to claim 1, wherein:
at least one operation of the plurality of operations can be performed both in a automatically commit mode and in a patch operation mode.

18. A method to provide a scripting framework for server configuration, comprising:
   associating an existing configuration file with a server, wherein the existing configuration file contains configuration data of the server;
   maintaining on the server a plurality of configuration management objects organized in a traversable hierarchy, wherein each of the plurality of configuration management objects is capable of maintaining a portion of the configuration data of the server;
   converting, by a scripting tool, the existing configuration file into an executable script file with a plurality of scripting instructions in a scripting language;
   interpreting the plurality of scripting instructions from the executable script file;
   establishing a connection to the server;
   enabling a user to navigate, interrogate, and/or update the configuration data of the server by invoking methods on the plurality of configuration management objects once the scripting tool is connected to the server when the server is running;
   performing a plurality of operations on the server using the plurality of scripting instructions via said connection;
   maintaining the connection until all of the one or more operations are performed,
   receiving scripting instructions directly from a user;
   displaying results of the scripting instructions to the user; and
   recording the scripting instructions received from the user into a script file which can be later executed by the scripting tool.

19. The method according to claim 18, wherein:
the traversable hierarchy can be a tree.

20. The method according to claim 18, wherein:
an operation in the plurality of operations can be one of:
   starting and/or shutting down the server;
   deploying and/or undeploying an application on the server;

navigating and/or updating the plurality of configurations management objects; and recording and saving the plurality of scripting instructions into the script file.

21. The method according to claim 18, further comprising:

defining a plurality of variables and/or a plurality of categories of scripting instructions via the scripting language.

22. The method according to claim 18, further comprising at least one of:

accepting, via a scripting interface, the plurality of scripting instructions interactively and interacting with the server;

interpreting the plurality of scripting instructions from the scripting interface; and executing the plurality of scripting instructions against the server.

23. The method according to claim 22, further comprising:

operating in interactive or script mode.

24. The method according to claim 22, wherein the script file can be in XML format.

25. A machine readable medium having instructions stored thereon that when executed cause a system to:

associate an existing configuration file with a server, wherein the existing configuration file contains configuration data of the server;

maintain on the server a plurality of configuration management objects organized in a traversable hierarchy, wherein each of the plurality of configuration management objects is capable of maintaining a portion of the configuration data of the server;

convert, by a scripting tool, the existing configuration file into an executable script file with a plurality of scripting instructions in a scripting language;

interpret the plurality of scripting instructions from the executable script file;

establish a connection to the server;

enable a user to navigate, interrogate, and/or update the configuration data of the server by invoking methods on the plurality of configuration management objects once the scripting tool is connected to the server when the server is running;

perform a plurality of operations on the server using the plurality of scripting instructions of a scripting language via said connection;

maintain the connection until all of the plurality of operations are performed;

receive scripting instructions directly from a user;

display results of the scripting instructions to the user; and record the scripting instructions received from the user into a script file which can be later executed by the scripting tool.

26. The machine readable medium according to claim 25, wherein:

the traversable hierarchy can be a tree.

27. The machine readable medium according to claim 25, wherein:

an operation in the plurality of operations can be one of:

starting and/or shutting down the server;

deploying and/or undeploying an application on the server;

navigating and/or updating the one or more configurations management objects; and recording and saving the one or more scripting instructions into the script file.

28. The machine readable medium of claim 25, further comprising instructions that when executed cause the system to:

define a plurality of variables and/or a plurality of categories of scripting instructions via the scripting language.

29. The machine readable medium of claim 25, further comprising instructions that when executed cause the system to perform at least one of:

accepting, via a scripting interface, the one or more scripting instructions interactively and interacting with the server;

interpreting the plurality of scripting instructions from the scripting interface; and executing the plurality of scripting instructions against the server.

30. The machine readable medium of claim 29, further comprising instructions that when executed cause the system to:

operate in interactive or script mode.

31. The machine readable medium of claim 29, wherein the script file can be in XML format.

* * * * *

UNITED STATES PATENT AND TRADEMARK OFFICE
CERTIFICATE OF CORRECTION

PATENT NO. : 8,180,864 B2  Page 1 of 1
APPLICATION NO. : 10/939257
DATED : May 15, 2012
INVENTOR(S) : Ghattu It is certified that error appears in the above-identified patent and that said Letters Patent is hereby corrected as shown below:

On sheet 2 of 6, in figure 2, Box 203, line 1, delete "Interprept" and insert -- Interpret --, therefor.

On sheet 2 of 6, in figure 2, Box 206, line 1, delete "Discoonect" and insert -- Disconnect --, therefor.

On sheet 3 of 6, in figure 3, line 1, delete "assing" and insert -- assign --, therefor.

In column 9, line 56, delete "(configpath," and insert -- (configPath, --, therefor.

In column 9, line 58, delete "configpath" and insert -- configPath --, therefor.

In column 12, line 54, in Claim 18, delete "performed," and insert -- performed; --, therefor.

Signed and Sealed this
Thirty-first Day of July, 2012

David J. Kappos
*Director of the United States Patent and Trademark Office*